United States Patent
Shacham et al.

(10) Patent No.: US 9,866,687 B2
(45) Date of Patent: Jan. 9, 2018

(54) SYSTEMS AND METHODS FOR PRESENTING A CALLER'S MEDIA CONTENT ON A CALL RECIPIENT'S PHONE DEVICE WITH A RECEIPT OF A PHONE CALL FROM THE CALLER

(71) Applicants: Lior Shacham, Ramat Hashofet (IL); Ofir Oron, Modiin (IL)

(72) Inventors: Lior Shacham, Ramat Hashofet (IL); Ofir Oron, Modiin (IL)

(73) Assignee: PICK UP MOBILE (2015) LTD, Ramat Hashofet (IL)

( * ) Notice: Subject to any disclaimer, the term of this patent is extended or adjusted under 35 U.S.C. 154(b) by 0 days.

(21) Appl. No.: 15/302,995

(22) PCT Filed: Apr. 12, 2015

(86) PCT No.: PCT/IL2015/050383
§ 371 (c)(1),
(2) Date: Oct. 9, 2016

(87) PCT Pub. No.: WO2015/155778
PCT Pub. Date: Oct. 15, 2015

(65) Prior Publication Data
US 2017/0085705 A1 Mar. 23, 2017

Related U.S. Application Data

(60) Provisional application No. 61/978,833, filed on Apr. 12, 2014.

(51) Int. Cl.
*H04M 3/42* (2006.01)
*H04W 4/12* (2009.01)
*H04L 29/06* (2006.01)

(52) U.S. Cl.
CPC ...... *H04M 3/42153* (2013.01); *H04L 65/601* (2013.01); *H04M 3/42382* (2013.01); *H04W 4/12* (2013.01); *H04M 2250/64* (2013.01)

(58) Field of Classification Search
None
See application file for complete search history.

(56) References Cited

U.S. PATENT DOCUMENTS

| 2006/0193448 A1 | 8/2006 | Donoghue et al. |
| 2008/0160956 A1* | 7/2008 | Jackson ................. H04M 3/02 455/406 |

(Continued)

FOREIGN PATENT DOCUMENTS

| EP | 2717554 A1 | 4/2014 |
| WO | 2011035442 A1 | 3/2011 |

OTHER PUBLICATIONS

Written Opinion of the International Searching Authority for PCT/IL2015/050383 Competed Sep. 7, 2015; dated Sep. 8, 2015 6 Pages.

(Continued)

*Primary Examiner* — Idowu O Osifade
(74) *Attorney, Agent, or Firm* — The Roy Gross Law Firm, LLC; Roy Gross

(57) ABSTRACT

A system for sharing, with the recipient of a phone call, data provided by a caller, comprising: A phone device, equipped and configured to collect data, link it to a recipient of an outgoing phone call, and send it, and a phone device equipped and configured to present the data sent to it by another phone device, as a part of an incoming call event. In various embodiments of the invention, the system is further comprised of a server configured to transfer the data between phone devices. In other embodiments the system is also comprised of a network enabling phone calls between (Continued)

phone devices. In some embodiments such sharing can be done by a caller using a single operation.

20 Claims, 14 Drawing Sheets

(56) References Cited

U.S. PATENT DOCUMENTS

2011/0014932 A1   1/2011  Estevez
2014/0067947 A1*  3/2014  Archibong .......... H04L 65/4084
                                                                              709/204
2014/0177813 A1*  6/2014  Leeds .................... H04M 3/02
                                                                              379/67.1

OTHER PUBLICATIONS

International Search Report for PCT/IL2015/050383 Competed Sep. 7, 2015; dated Sep. 8, 2015 5 Pages.
International Preliminary Report on Patentability Completed Aug. 17, 2016 22 Pages.

* cited by examiner

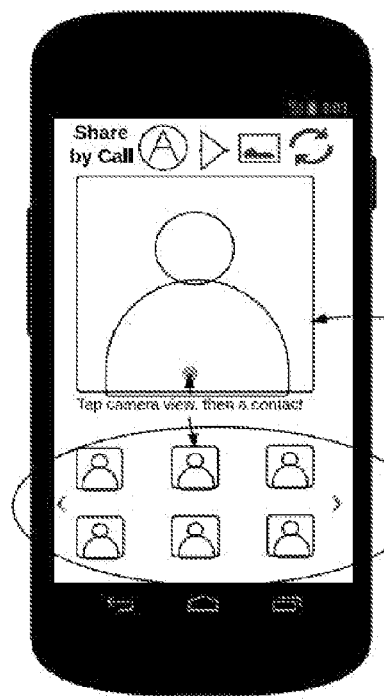

Using a single screen for selecting a V&A and a recipient for sharing by a phone call.

Selection of V&A is done by one tap on camera view area- 7000

Selection of recipient is done by one tap on of the contact images appearing on area 7010

In one embodiment of this screen's UI tapping a contact, can mean a selection pf both a recipient and a V&A. For example by capture a photo and share it by making an outgoing call to that contact.

FIG. 7

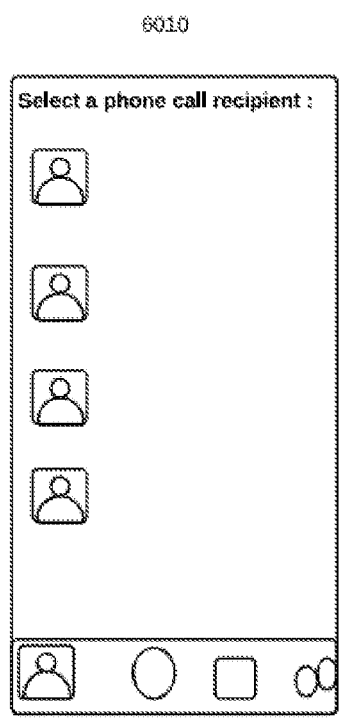

An embodiment of selecting a V&A by the system:

Using default (or similar to default) phone-call recipient selecting screen 6010, the system presnets the option to select a recipient. The selection of the V&Ais done by the system by capturing a short V&A when a recipient is being selected, by the user, or at a similar event.

FIG. 7A

SYSTEMS AND METHODS FOR PRESENTING A CALLER'S MEDIA CONTENT ON A CALL RECIPIENT'S PHONE DEVICE WITH A RECEIPT OF A PHONE CALL FROM THE CALLER

This application is a 35 U.S.C.§371 national phase application of PCT/IL2015/050383, filed Apr. 12, 2015, which claims priority to U.S. 61/978,833 filed on Apr. 12, 2014. Both applications are incorporated herein by reference as if fully set forth.

FIELD OF THE INVENTION

This invention generally relates to systems and methods of digital sharing of visual and audio data, such as sharing a text, a photo, or a video using an email, or a messaging platform. More particularly, this invention relates to sharing such data by using phone calls. More particularly, this invention relates to sharing such data with a recipient as a part of the phone call event.

BACKGROUND OF THE INVENTION

At present, users of mobile devices must use dedicated services to share V&A data. Such services are comprised of services such as Whatsapp™, Gmail™, Skype™ native phone provider SMS services etc.

The aforementioned services employ systems and methods that enable users with the sharing of V&A data through their phone devices. Such phone devices may be mobile as smartphones or stationary as PC computers, as long as they allow the initiation of phone calls (audio or video). But such known methods and systems, don't provide callers with control over data that is accompanied with outgoing phone calls.

For example, a caller that wishes to initiate a phone call event may not presently choose a custom ringtone that will be played on the recipient's phone device while receiving the phone call. At best, a caller may initiate a phone call while, manually sending a V&A massage that may or may not be seen by the recipient and certainly not playing the V&A data on the recipient's phone device, replacing the recipient's default ringtone or image.

Presently, there are 2 data types shared by phone devices on the event of initiating a phone call:

1. Fixed caller signatures such as phone numbers, shared every time the caller makes a phone call, regardless of the identity of the recipient of the phone call. Such signatures do not contain V&A data.

Changing of such signatures is not part of the outgoing call, nor is it a fast, one or two operation process, done by the caller.

2. Synchronous data, usually video streaming, transmitted on the event of VoIP calls.

Such data is not selected by the caller, nor can the caller alter the type and content of the data for a specific phone call.

As can be seen, using these accompanying data types is not possible to provide the caller with control means over the recipient's phone D&S.

As can be seen known methods and systems do not provide necessary options and functions to allow callers to effectively communicate. Inter-alia, these known methods and systems fail on providing:
   a. Callers with means to control recipient's phone device D&S;
   b. Callers with effective means of communication while initiating a phone call even before the receiving user answers the phone call;
   c. Businesses with the ability on initiating V&A advertisements on their costumer's phone device at the initiation of a marketing call.

SUMMARY OF THE INVENTION

The present invention discloses systems and methods for sharing selected V&A data by a phone call with a specific recipient. The system is comprised of at least 1 phone device, configured as a caller device, and at least 1 phone device, configured as a recipient device.

The present invention enables the caller device to share the selected V&A data with the recipient device in a mostly concurrent manner to the initiation the phone call event, while the recipient device receives said data and presents said data in any time near (or before) the receiving of the phone call event.

Some embodiments of the invention are systems and methods for sharing data with a recipient by a phone call. Some embodiments provide an ability to share selected data with a selected recipient, and/or on a selected call. The sharing, and/or the selecting, creating and/or entering of the data, is made, on some embodiments of the invention, on the event of initiating the outgoing phone call. The sharing, on some embodiments, involves a single operation from the caller, to be made.

The invention adds a new way of sharing, so far not exploited, by using the medium of phone calls, and in some embodiments, specifically the very noticeable event of the phone call itself (usually comprised of a sound, vibration, and/or a noticeable display) to share data, and/or content between parties.

Some embodiments use 2 or more phone devices equipped and configured as described in this application.

In some embodiments, the shared data contains V&S (Visual, and/or Sound) sent by the caller's device, and can be used for sharing media, information, messages, etc, between 2 parties, using a phone call.

In some of the embodiments such a sharing can be done by a caller using single operation, making it very easy and fast to share.

Some examples of using various embodiments may include:

1. A caller snapping a photo of himself, then calls his girlfriend, who sees the picture of her friend, and a text message he added, on her incoming screen.

2. A caller shares a 'Happy birthday' song, which will be played on his friend's phone, while the caller is calling him.

3. An alert system that will call the owner of a house, sharing a photo of his front door when a burglary attempt has been made.

The present invention provides necessary options and functions to allow callers to effectively communicate. Inter-alia, the present invention provides:
   a. Callers with means to control recipient's phone device D&S;
   b. Callers with effective means of communication while initiating a phone call even before the receiving user answers the phone call;
   c. Businesses with the ability on initiating V&A advertisements on their costumer's phone device at the initiation of a marketing call.

BRIEF DESCRIPTION OF THE DRAWINGS

The invention can be more fully appreciated in connection with the following detailed description, taken in conjunction with the accompanying drawings, in which:

FIG. 7. Illustrates an optional UI for a single caller screen implementation of the invention, and for a single caller operation implementation of the invention, with one embodiment of the invention.

FIG. 7A. Illustrates another optional UI for a single caller screen implementation of the invention, and for a single caller operation implementation of the invention, with another embodiment of the invention.

DETAILED DESCRIPTION OF THE PREFERRED EMBODIMENTS

System-Minimal#

Figure 1:
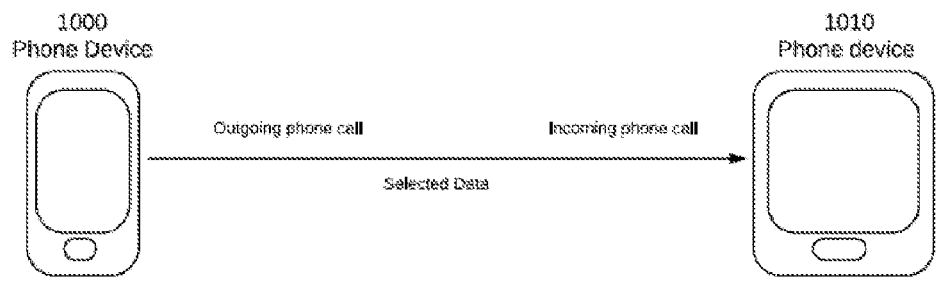
FIG. 1 illustrates components of another system implementing the function of the invention: Sharing a selected V&A data with a recipient using a phone call, with an embodiment of the invention.

FIG. 1 illustrates components of a system implementing the function of the invention: Sharing data with a recipient using a phone call, with an embodiment of the invention.

Phone device 1000 is equipped and configured to perform a caller's phone function, of getting and sending the shared data, linking it to the caller id, and initiating an outgoing call.

Phone device 1010 is equipped and configured to perform a recipient's phone function, of receiving the shared data, getting the incoming call's caller id, matching caller id of incoming call, with that linked to the data, and if a correct match exists—present the incoming data, linking it to the caller.

The link between the caller id and the data can be done in many ways, like writing both to the same db line, sending both at a same event, etc.

System-with Server and a Network#

Figure 1A:
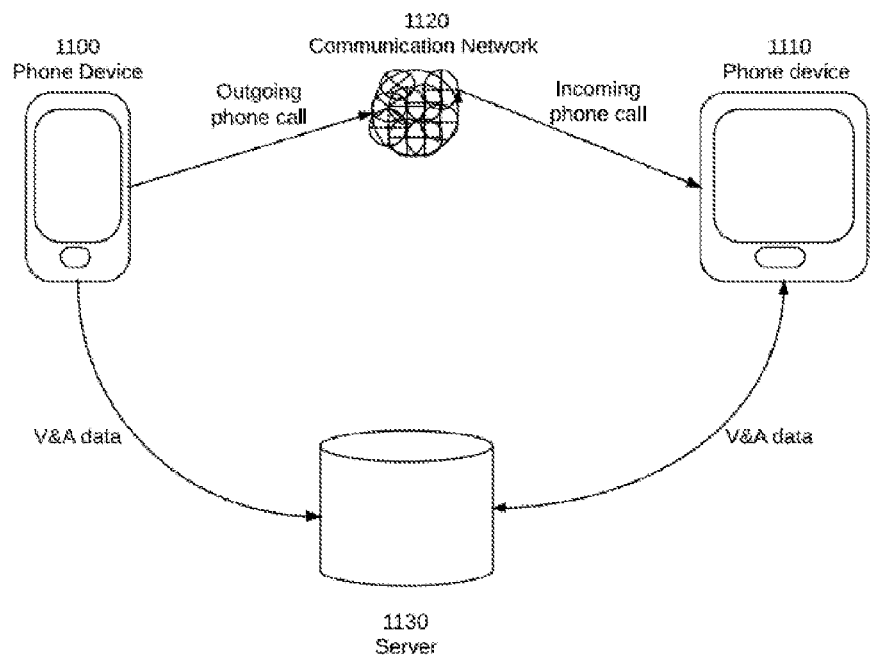
FIG. 1A illustrates components of a system implementing the function of the invention with another embodiment of the invention.

FIG. 1A illustrates components of a system implementing the function of the invention: sharing a selected V&A data with a recipient, using a phone call.

Phone device 1100 is a phone device equipped and configured to perform its function: get V&A data and send to a recipient of an outgoing call. It can be any kind of phone device, equipped to get and send V&A data. The device may be a mobile or landline phone, a computing device capable of making phone calls, etc. Equipment for getting data may include integrated or attached recording elements, like a camera, a microphone, a keyboard for entering text, etc. It can also consist of a communication system, enabling the phone to import external data, like an internet connection. Equipment for sending the data may include any element enabling communication between phone devices, like radio, internet, and/or WiFi elements, etc.

The configuration of device 1100 to perform its function may be done by software and/or hardware configuration. In one embodiment the configuration may be done using a phone app installed on the device. In another embodiment the configuration may be done using the operating system installed on the device. In another embodiment the configuration may be done using a combination of these two mentioned embodiments, with or without a dedicated hardware configuration.

Phone device 1110 is a phone device equipped and configured to perform its function: receive and present V&A data as a part of an incoming call event. It can be any kind of phone device, equipped to present V&A data. The device may be a mobile or landline phone, a computing device capable of receiving phone calls, etc. Equipment for presenting V&A data may include integrated or attached presenting elements, like a screen, a projector, a speaker, etc. Equipment for receiving data may include any element enabling communication between phone devices, like radio, internet, and/or Wi-Fi elements, etc.

In one embodiment of the invention, the device may be also equipped with an element that notices an incoming call event and notify it to other elements. In another embodiment it can be done by an element that notices a notification that alerts an incoming event, and notify it to other elements.

Other embodiments may include other types of elements, that notice other events, associated with an incoming call, and notify it to other elements.

The configuration of device 1110 to perform its function may be done with a software and/or hardware configuration. In one embodiment the configuration may be done using a phone app installed on the device. In another embodiment the configuration may be done using the operating system installed on the device. In another embodiment the configuration may be done using a combination of these two mentioned embodiments, with or without a dedicated hardware configuration.

In one embodiment of the invention, both phone devices used by the system are equipped and configured as 1100 and 1110 as well. In that manner, both devices can perform the function of the invention: sharing a provided V&A data with a recipient using a phone call, as the sharing party, and the shared party. In one embodiment the called party can also send data during the phone call, which will be presented on the calling party device.

Network 1120 is a communication network enabling phone calls between phone devices. It may enable phone calls between landline, mobile, satellite, VoIP phones and/or other types of phones.

In one possible embodiment of the invention the network may be a part of components 1100, 1110, and/or 1130.

Server 1130 is a server, or a cloud server, configured by hardware and/or software to transfer data between device 1100 and device 1110 over a communication network of any kind, such as an internet network, a radio network, etc. The server may pull, and/or push the data between the devices, for example by using Http, IM, and/or push notifications. The server may add additional data to the data, such as: the id of the sending or pulling device, the time of data transfer, the method of data transfer, the location of data transfer and/or other characteristics of the data transfer. This kind of data may also be referred as Metadata.

The use of metadata for matching a sent V&A with an incoming call characteristics, like caller id, time data, etc., enables sharing with a specific recipient only, and/or sharing on a specific call only.

In one possible embodiment of the invention the server may be a part of components 1100, 1110, and/or 1120.

Caller's Device Configuration#

Figure 2:
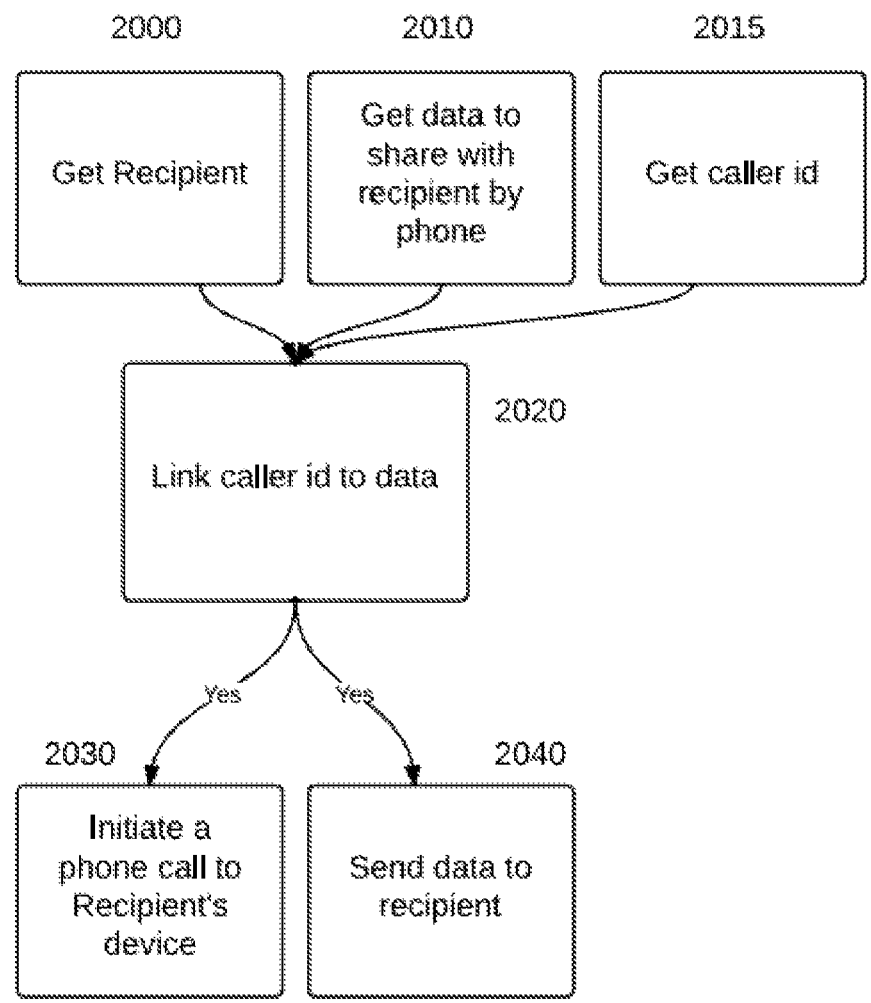
FIG. 2 illustrates steps configured on the caller's phone, for implementing the function of the invention, with an embodiment of the invention.

FIG. 2 illustrates steps configured on the caller's phone, for implementing the function of the invention, with an embodiment of the invention.

2000—Get a selected recipient for a phone call (in some embodiments by presenting options, and a select mechanism, like a button)

2015—Get a caller id of the device—In some embodiments get other metadata of device, caller, phone call event, etc. This can be done using various methods, such as the phone's sdk, and/or API.

Notice—Every time a match/link between a phone call and a sent data is made or checked, it can be done using various identifiers, including caller id, recipient's id, timestamps, and/or other types of metadata.

2010—Get a selected V&A (in some embodiments by presenting options, and a select mechanism, like a button)

2020—Link the device's caller id to the selected V&A (using any kind of link)

2040—Send the selected V&A, and/or a link to it, to the recipient's device

2030—Initiate a phone call to recipient's device

Figure 2A:
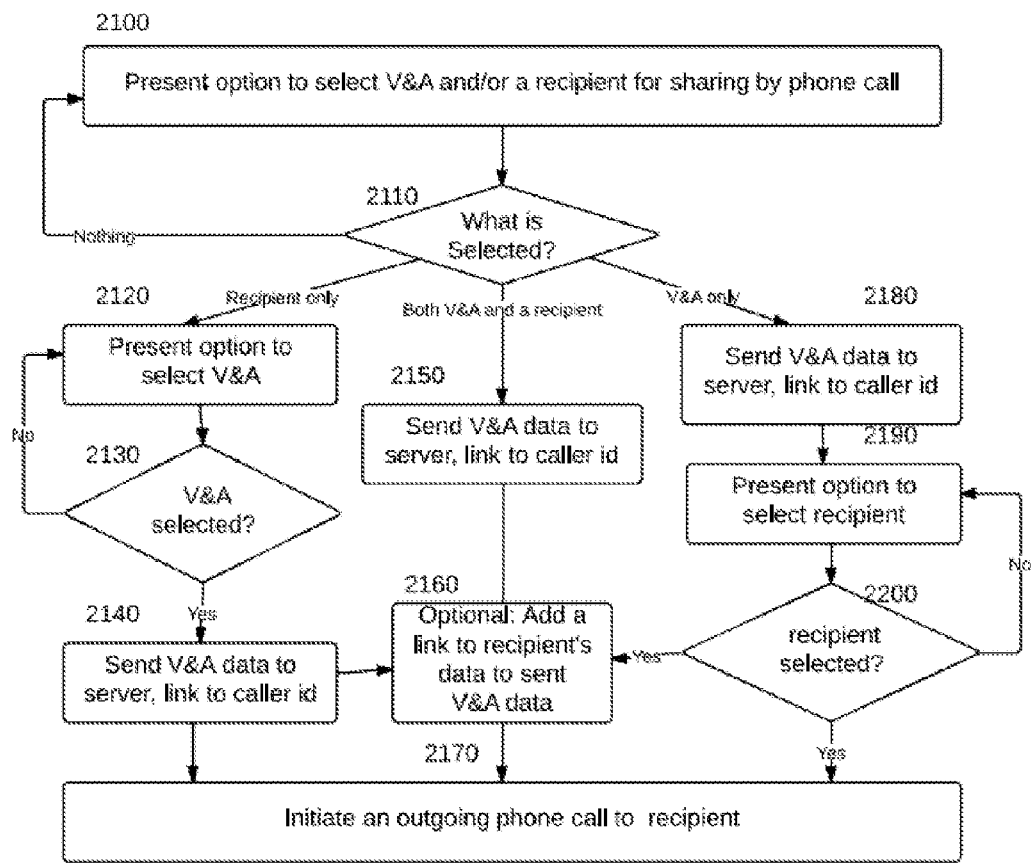
FIG. 2A illustrates steps configured on the caller's phone, for implementing the function of the invention, with another embodiment of the invention.

Some of the explanations of elements, methods and configurations on FIG. 2A, are also relevant regarding those elements, methods and configurations on FIG. 2.

For additional explanations of this FIG. 2 please see 2A as well.

FIG. 2A illustrates a configuration for implementing the function of the invention: sharing selected V&A data with a recipient using a phone call, with an embodiment of the invention.

Steps 2100-2170 may be done using the system configured on phone device 1100, described on FIG. 1A. Some of the steps may be done using other components described on FIG. 1A.

Some of the explanations regarding FIG. 2A, are also relevant regarding FIG. 2.

For that matter performing 2100 is the equivalent of performing 2000, 2010 and/or 2015.

Selecting V&A and/or a Recipient for Sharing by a Phone Call#

The system performs 2100: presents an option to select V&A and/or a recipient for sharing by phone call.

When to Perform 2100, 2000, 2010, 2015?#

2100 may be performed at several events of using 1100 by the user.

It can be performed when an app is launched, including, but not limited to:

a) A phone-calling app installed on the device (such as the default phone calling app, another phone-calling, a VoIP app, etc)

b) A V&A capturing app, like the camera app, microphone app, video app c) A V&A storing and/or sharing app, like the gallery app, a files browsing app, etc d) A software and/or button is pressed, such as the camera button e) A specific command is given by the user. Such as a command to make a phone call, to share a V&A, to capture a V&A, etc

Presenting Methods#

2100 may be presented by visual display, a sound played, and/or a hardware element:

The visual display of 2100 may include optional V&A and/or recipients for sharing, like a photo, a video, a sound file, etc, for V&A, and a list of contacts for a recipient, and/or a visual object enabling capturing and/or entering of V&A, like a camera button and/or a keyboard.

Examples of visual displays for 2100 include one or more of:

a) A camera view with an option to capture a photo, or a video, to be selected as a V&A.

b) A text field, with an option to enter text to be selected as a V&A.

c) A microphone button, with an option to record voice to be selected as a V&A.

d) A browsing or selecting button, and/or a menu for selecting V&A and/or selecting a recipient.

e) A share button presenting option to select V&A and/or a recipient for sharing.

The sound played in 2100 may include a message asking the caller user of 1100 to select a V&A and/or a recipient for sharing. The message can ask the user to enter, record and/or select a V&A by voice, touch and/or other methods.

The hardware element enabling capturing and/or entering of V&A like the devices hardware camera button and/or an external keyboard.

Select V&A and/or a Recipient?#

2100 can present options to select V&A and/or a recipient for sharing by phone call:

In events of using 1100 in which a specific V&A is presented or selected, like an event of a picture taken by the device's camera, or a picture shown on the gallery app, 2100 can present the option to select only the recipient. In such cases the presented or selected V&A will be considered selected by the system (2110=V&A only)

In events of using 1100 in which a specific recipient is presented or selected, like an event of a recipient or a contact is being selected, or highlighted from a list of contacts, such as the address book, the phone calling app, or any other app enabling choosing of a contact, 2100 can present the option to select only the V&A. In such cases the presented or selected recipient or contact will be considered the selected recipient by the system (2110=Recipient only)

Who Selects and when#

The V&A and/or recipient selecting can be done by a user of 1100 at the event of a phone call, at the event of selecting a V&A for sharing by phone call, and/or in advance, prior to the phone call event. In one embodiment of the invention a specific V&A can be configured by a user to be shared every time he calls a specific, and/or a group of recipients, for example by using the system settings.

The V&A and/or recipient selecting can also be done by the system.

In one embodiment the system can be configured to capture and select a V&A to be shared by phone call. For example, a picture of the caller, or his location when initiating a phone call, can be captured by 1100's sensors and shared by phone call. An embodiment of the invention may enable configuring such a share to be done with every call, or with predefined calls, and or recipients only.

In another embodiment the system can be configured to select a recipient by operating rules, such as selecting a recipient if he is recognized by the system as appearing in the V&A data.

Steps of 2100#

When 2100 presents the option to select V&A and a recipient, it can be performed in one or more steps. Including, for example:

a) A two steps process, in which an option to select a V&A is presented, and then an option to select a recipient is presented.

b) A two steps process, in which an option to select a recipient is presented, and then an option to select a V&A is presented.

c) A single step process in which an option to select a V&A is presented with an option to select a recipient (for example, by using the same visual display, and/or the same audio message to present both options)

Completing the Selection, Sending V&A and Making a Call#

2A. Option 2120

When the answer to 2110 is 'Recipient only' the system performs 2120. 2120 is an operation which is the part of 2100, which presents option to select V&A, and is explained before.

When 2130=Yes, 2140 is performed by the system using the phone device 1100. In one embodiment, the data is being sent to the server 1130 described on FIG. 1A. The sending and/or upload to the server can be done using various methods, like HTTP or other methods.

In other embodiments, the data can be sent directly to the recipient's phone device 1110 described on FIG. 1A. It can be sent by a communication method, like radio, internet, Wi-Fi, etc, over a notification message, or other form of data transfer.

The V&A data may include Visual data and/or Audio data (like image, text, voice recording, audio files, video, etc) sent from caller device. It may include data collected by the phone device sensors, like geographical location, temperature, body temperature of device's holder, etc. The data may also include metadata, like an encryption key, a link to the data's location on the devices hardware drive, etc.

After 2140, the system performs 2170, and initiates a phone call to the recipient using the phone device 1100. It may be done using network 1120 described on FIG. 1A. In an embodiment of the invention, the phone call is delayed, in order to give enough time for the V&A data to be sent, and/or uploaded to the server. In such case a display and/or a sound can be presented to the user indicating an uncompleted action, like a spinning spinner, and/or a progress bar.

In another embodiment of the invention 2180 is done 'in the background', while 2170 is done, in order to provide enough time for the V&A data to be sent, and/or uploaded to the server.

The phone call type in 2170 can be VoIP, regular telephony call, a mobile phone call, a satellite phone call, etc depending on different causes like network availability, quality, price, etc.

In one embodiment a VoIP call is used to call recipients with an iOS phone devices, in order to enable the system its main function, due to iOS limitations on several actions regarding regular phone calls (like receiving an incoming call by a 3rd party app).

Option 2180#

When the answer to 2110 is 'V&A only' the system performs 2180, which is exactly identical to 2140, which is explained before. In an embodiment of the invention, a next step, 2190, or 2170 is delayed, in order to provide enough time for the V&A data to be sent, and/or uploaded to the server. In such case a display and/or a sound can be presented to the user indicating an uncompleted action, like a spinning spinner, and/or a progress bar.

In another embodiment of the invention 2180 is done 'in the background', while 2190, 2200 and\or 2170 is done, in order to provide enough time for the V&A data to be sent, and/or uploaded to the server.

After, or while 2180 is done, 2190 is performed. 2190 is an operation which is the part of 2100 that presents option to select recipient, and is explained before.

When 2200=Yes, 2170 is performed by the system using the phone device 1100, as explained before.

Option 2150#

When the answer to 2110 is 'Both V&A and a recipient' the system performs 2150, which is exactly identical to 2140, which is explained before. In an embodiment of the invention, the next step, 2170 is delayed, in order to provide enough time for the V&A data to be sent, and/or uploaded to the server. In such case a display and/or a sound can be presented to the user indicating an uncompleted action, like a spinning spinner, and/or a progress bar.

In another embodiment of the invention 2180 is done 'in the background', while 2170 is done, in order to provide enough time for the V&A data to be sent, and/or uploaded to the server.

Embodiment of Caller's Device Configuration#

Figure 2B:
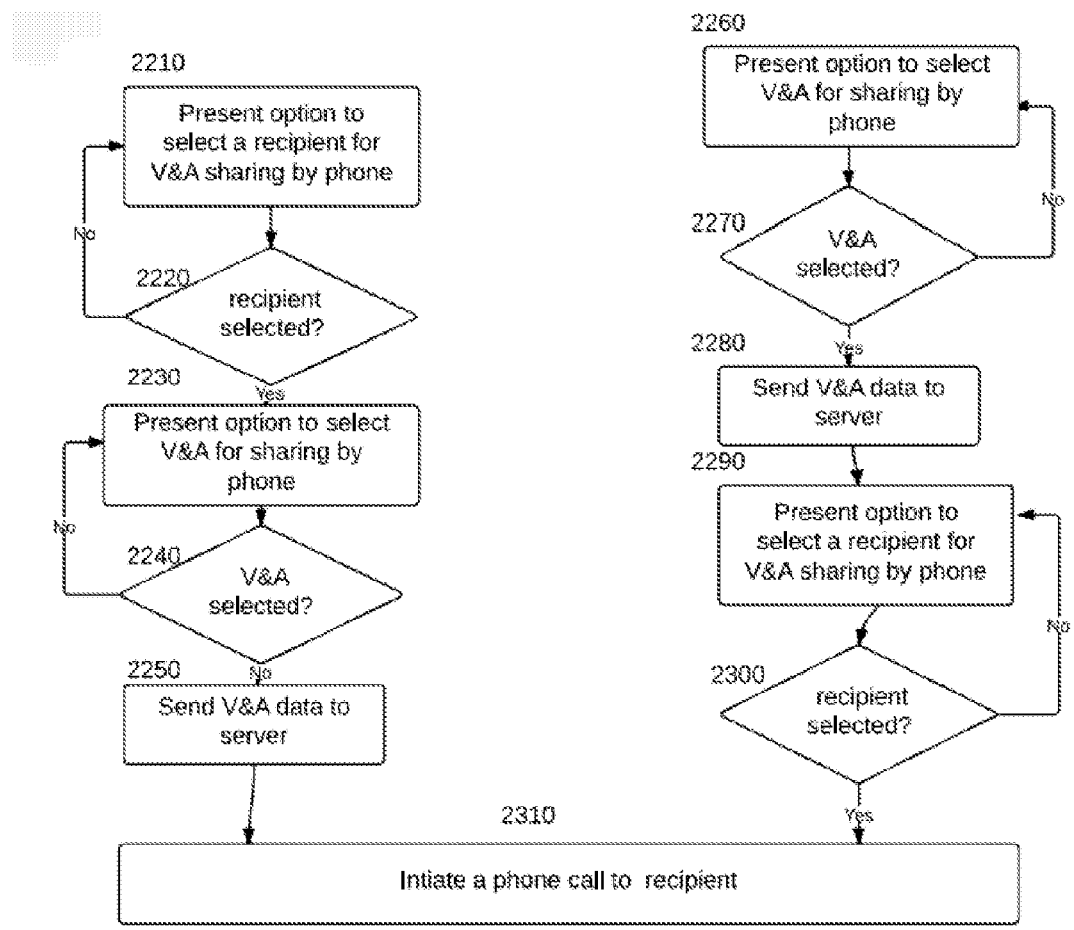
FIG. 2B illustrates steps configured on the caller's phone, for implementing the 100 function of the invention, with another embodiment of the invention.

FIG. 2B illustrates an embodiment of the invention, illustrating an optional method for selecting a V&A and recipient for sharing, sending a V&A, and initiating a call to recipient.

FIG. 2B illustrates an embodiment of the configuration described on FIG. 2A.

An Incoming Phone Call Event#

Figure 3:
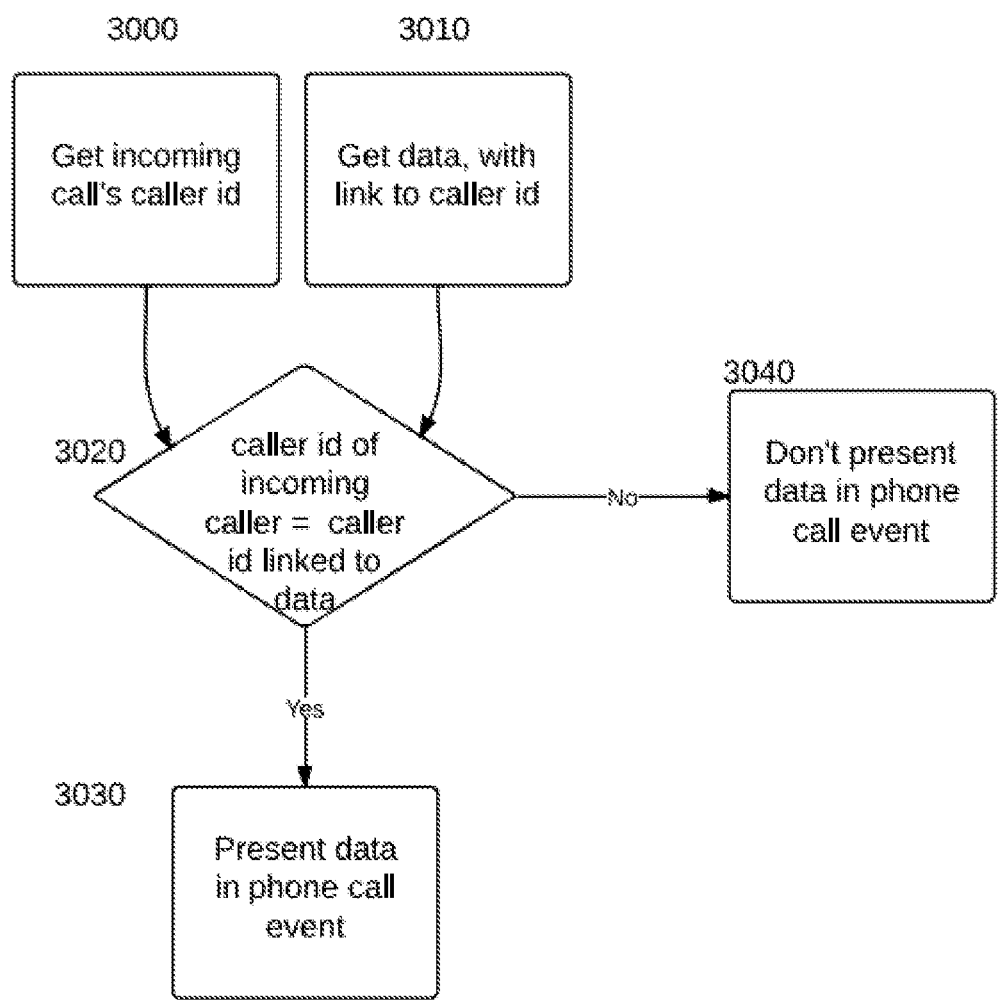
FIG. 3 illustrates steps configured on the recipient's phone, for implementing the function of the invention, with an embodiment of the invention.

FIG. 3 illustrates steps configured on the recipient's phone, for implementing the function of the invention, with an embodiment of the invention.

The term Caller ID mentioned on this figure refers to any one, or more data pieces (such as the caller's phone number, the caller's email, etc) that can by itself, or combined with other such data pieces, indicate the unique id of the caller.

3000 is getting the caller id of phone calls that are incoming to the phone device 1110. These characteristics can be provided by different elements of the phone device, such as its operating system, API's, apps installed on it, etc. The characteristics can also be provided, with the phone call, by the phone network, such as 1120, described in FIG. 1A.

3010 gets the data, and/or V&A sent to the device by the system. The data can be stored on a server, such as 1130 described in FIG. 1A, or on other components of the system, such as the caller's device 1100. In one embodiment, such as described in FIG. 4 the V&A can be sent to device 1110 in advance, for example by a push notification from a server, or by an IM from device 1100.

3020 can be answered 'Yes' if there is a good enough match between the caller id collected on 3000, and the caller id collected in 3110. Such a match can be, for example:
  a) Identical phone number.
  b) A very similar phone number. For example the same phone number, with, or without a country prefix.

3030 may be presented by visual display and/or a play of a sound or an audio. It can also be presented as a combined visual data and audio data, like a video. 3030 may be presented as a part of the incoming call display and/or sound, such as the incoming call screen, or the incoming call sound alert, or ringbone, that are presented until the call is answered. It can also be presented during the call itself. It can also be presented after the call has been ended, as associated with the call. For example it can be presented as associated with the call, in the 'Recents' section of the phone calling app. In another embodiment the data can be stored on the receiving device, without association to the call.

3030 can be presented using the default receiving D&S of the device, by sending the data to the local and/or remote database of the default phone receiving app, and/or contacts app. This sending action can be done by using an API, a service, or a hack on the operating system of the device. In another embodiment, 3030 can be presented using a dedicated D&S for an incoming phone call event. Such a D&S can be designed and configured to perform its function of presenting the data, by using the devices operating system, it's SDK, API, default apps, other installed apps, and/or a dedicated app.

3040 can be done using the default phone call receiving method of the device. For example it can present the default incoming screen and/or ringtone, presented by the device's default phone app, without adding any data. 3140 can also be replaced by any other action, such as presenting a dedicated D&S, or even for taking no action at all by the system in such event.

Figure 3A:
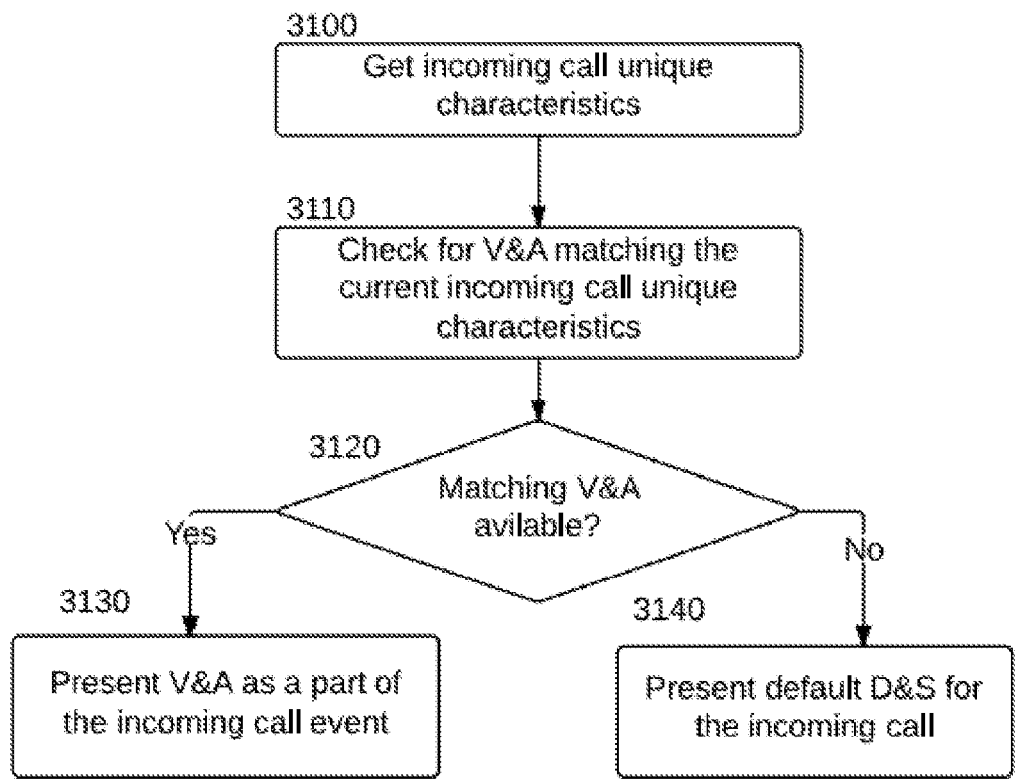
FIG. 3A illustrates steps configured on the recipient's phone, for implementing the function of the invention, with another embodiment of the invention.

FIG. 3A illustrates steps configured on the recipient's phone, for implementing the function of the invention, with another embodiment of the invention.

Steps 3100-3140 are done using the system configured on phone device 1110, described on FIG. 1A. Some of the steps can be done using other components described on FIG. 1A.

3100 is getting the unique characteristics of phone calls that are incoming to the phone device 1110. These characteristics can be provided by different elements of the phone device, such as its operating system, API's, apps installed on it, etc. The characteristics can also be provided with the phone call by the phone network, such as 1120, described in FIG. 1A.

The unique characteristics of an incoming call, that can also be called 'The phone call Metadata' include the caller id=the id of the calling device, such as its telephone number, the time the call was initiated and/or received and more details that are associated with that incoming call and can differentiate it from other incoming phone calls.

After 3100 is done, the system performs 3110. The matching V&A can be stored on a server, such as 1130 described in FIG. 1A, or on other components of the system. In one embodiment, such as described in FIG. 4 the V&A can be sent to device 1110 in advance, for example by a push notification from a server, or by an IM from device 1100.

3120 can be answered 'Yes' only if there is a good enough match between the data collected on 3100, and the check performed in 3110. Such a match can be, for example:
  a) Same caller id, similar outgoing and/or incoming time.
  B) Same caller id, if the system is configured to set any irrelevant V&A as unavailable. A V&A should be rendered irrelevant if it was meant to be sent as a real-time V&A, and a time period set by the system has passed (for example, a 5 min period).

3130 may be presented by visual display and/or a play of a sound or an audio. It can also be presented as a combined visual data and audio data, like a video. 3130 may be presented as a part of the incoming call display and/or sound, such as the incoming call screen, or the incoming call sound alert, or ringtone, that are presented until the call is answered. It can also be presented during the call itself. It can also be presented after the call has been ended, as associated with the call. For example it can be presented as associated with the call, in the 'recent' section of the phone calling app. In another embodiment the V&A can be stored on the receiving device, without association to the call.

3130 can be presented using the default receiving D&S of the device, by sending the V&A to the local and/or remote database of the default phone receiving app, and/or contacts app. This sending can be done by using an API, a service, or a hack on the operating system of the device. In another embodiment, 3130 can be presented using a dedicated D&S for an incoming phone call event. Such a D&S can be designed and configured to perform its function of presenting the V&A, by using the devices operating system, it's SDK, API, default apps, other installed apps, and/or a dedicated app.

3140 can be done using the default phone call receiving method of the device. For example it can present the default incoming screen and/or ringtone, presented by the device's default phone app.

Embodiment—System Configuration Using Push

Figure 4:
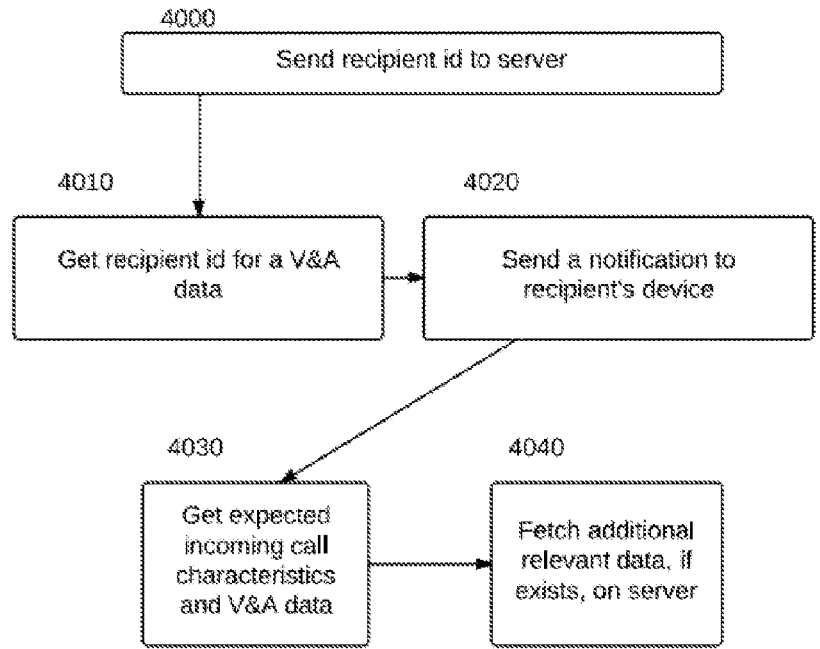
FIG. 4, 4A illustrates configuration of a system comprised of at least 2 phones, and a server configured to send push notifications, to implement the invention's function, with one embodiment of the invention.
Figure 4A:
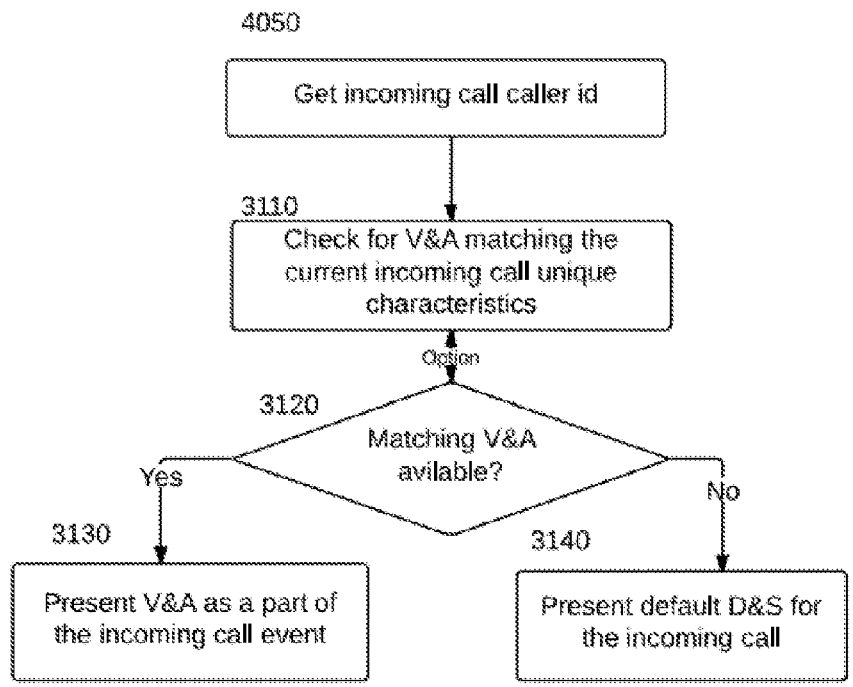

FIG. 4 illustrates an embodiment of the invention comprised of a server configured to send push notifications to implement the invention's function, with one embodiment of the invention.

4000 is performed by caller phone device 1100, immediately when a recipient is selected. It can happen before, and/or after a V&A is selected to be shared with that recipient.

4010 is performed by phone device 1100, when both the recipient and the V&A are selected. It can happen by inserting the V&A and the recipient's id to the same line on the db, or by other methods, as long as it creates a link between the two.

4020 and 4030 are performed by the server 1030. The notification sent in 4030 may be a push notification, and may include V&A data such as text, a reference to a V&A data, such as a link, the metadata of the V&A data, etc. The notification can be sent prior to the V&A data be uploaded fully to the server, as long as it is linking to the place the data will be uploaded to.

4040 and 4050 are done by phone device 1110, by using the information sent on 4030. 4040 can be done by importing the sent data itself 4050 can be done by downloading data that was not directly sent on 4030, like a photo, that 4030 gave the link to.

V&A Sources, Types, D&S Types#

Figure 5:
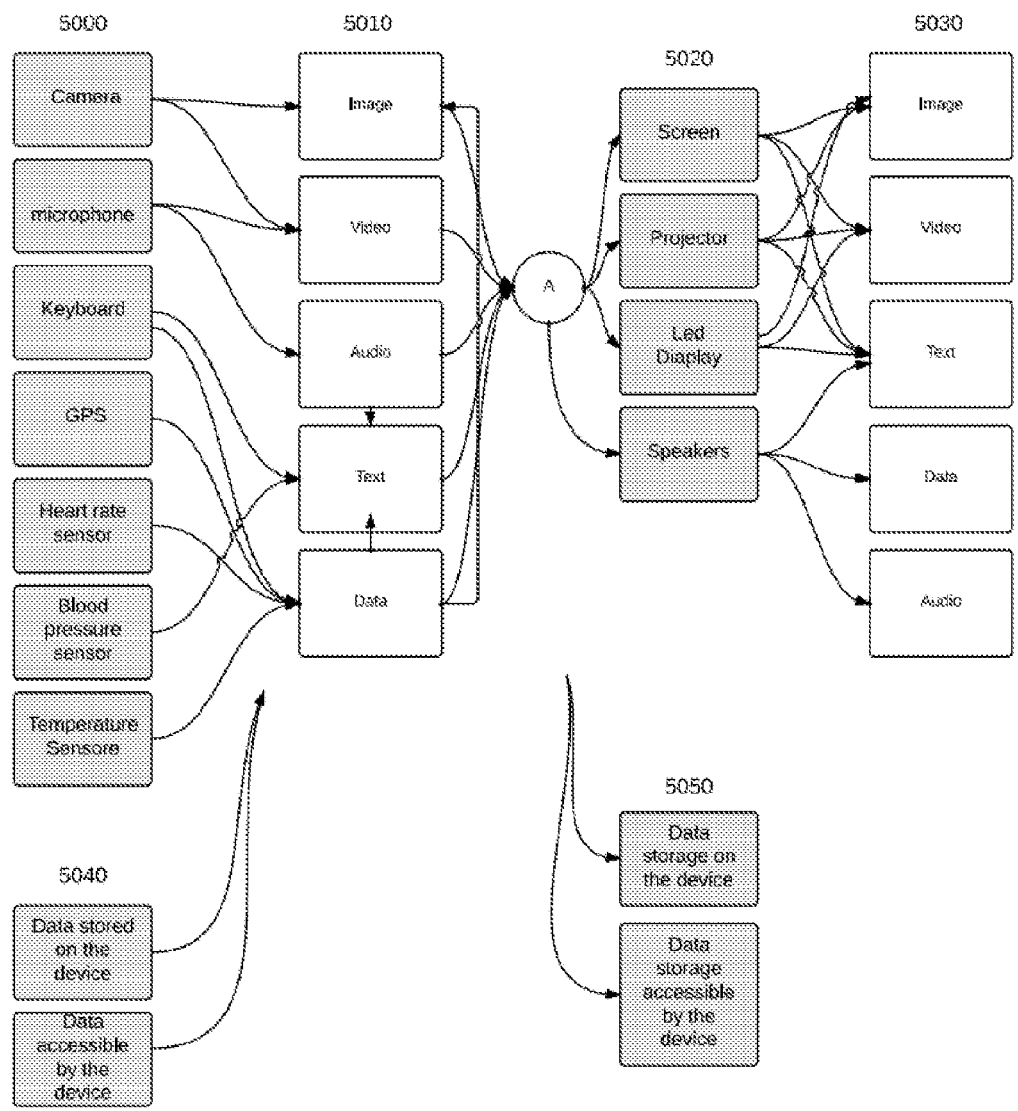
FIG. 5 illustrates optional sources for V&A, optional V&A types, and optional V&A presenting elements, in one embodiment of the invention.

FIG. 5 illustrates optional sources for V&A, optional V&A types, and optional V&A presenting elements, in one embodiment of the invention.

5000, 5040 illustrates optional sources for V&A. Those can be built-in within the device, externally attached to it, and/or connected to it virtually.

5010 illustrates optional V&A types for sharing.

The arrows are showing optional connections between sources and V&A types.

The arrows leaving 5040 represents a link between 5040 to each of 5010 options.

Figure 6:
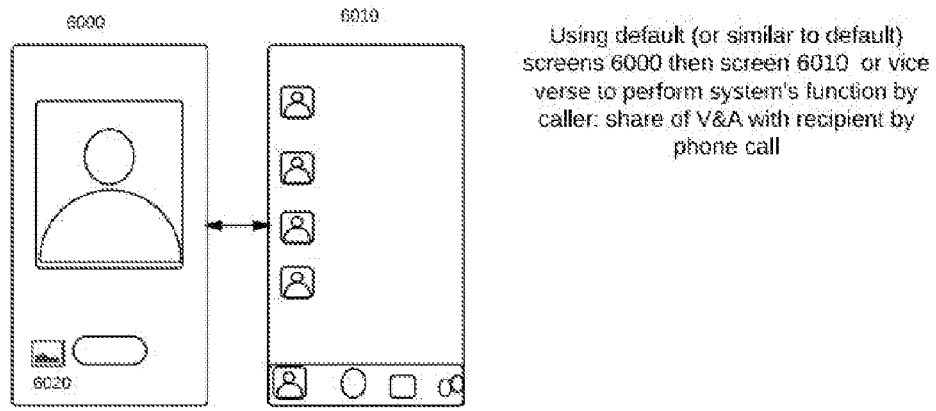
FIG. 6. Illustrates UI embodiments for presenting V&A and/or recipient selection options to the caller, including options for utilizing device's existing UI, or adding a single button to existing UI, for configuring it to perform its invention function.
Figure 6A:
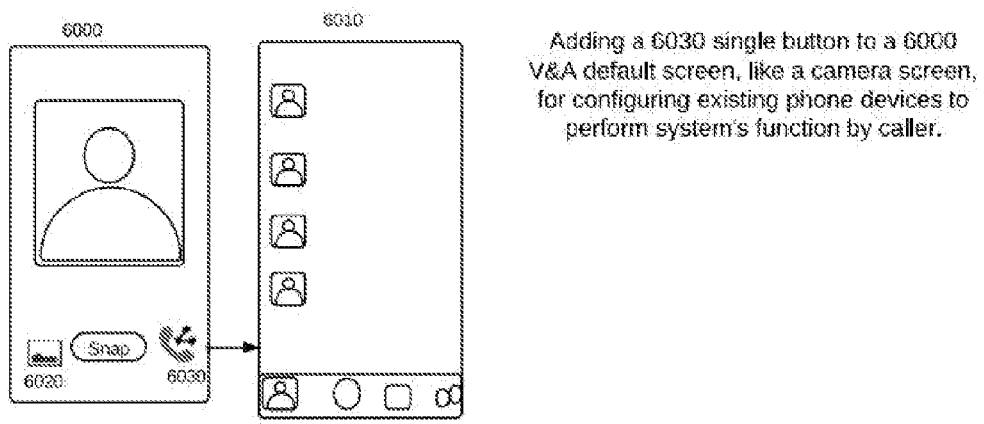
FIG. 6A. Illustrates optional UI for a single operation selection of V&A and recipient for sharing, with one embodiment of the invention.
Figure 6B:
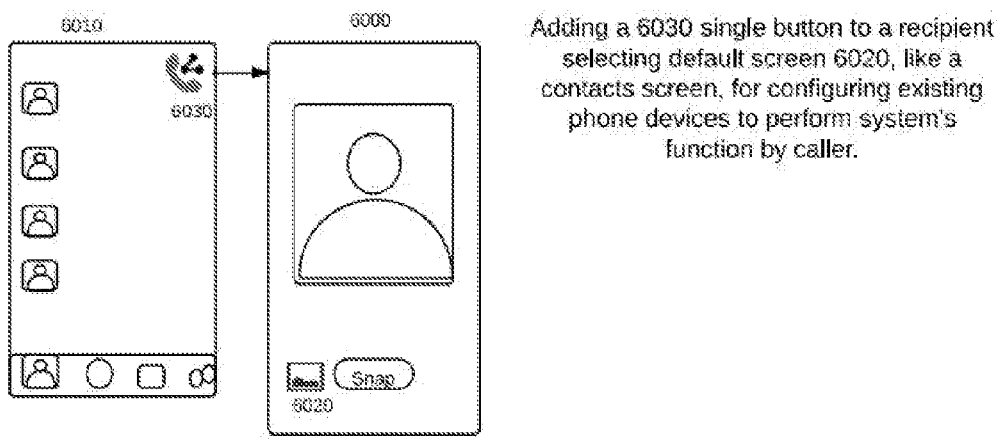
FIG. 6B. Illustrates an extra optional UI for a single operation selection, involving a V&A selected by the system, with one embodiment of the invention.

Sources 5040 can be accessible using different UI's for selecting V&A, like those described in FIG. 6, 6A, 6B. For example, selecting 6020, opens the device's photo gallery and/or shows an option to browse a file system, and by doing so access one or both of 5040 sources.

5020 illustrates optional V&A presenting elements of the recipient's phone device.

5030 illustrates optional shared V&A types.

The arrows are showing optional connections between presenting elements and V&A types.

5050 represents sources for storing shared data by recipient's device. This storing can be done in one embodiment of the invention, not done in another. In another embodiment the shared V&A can be deleted from the device, and the server, to ensure it is not accessible after the phone call has terminated.

The arrows leading to 5050 represents a link between A to each of 5050 options.

Figure 5A:
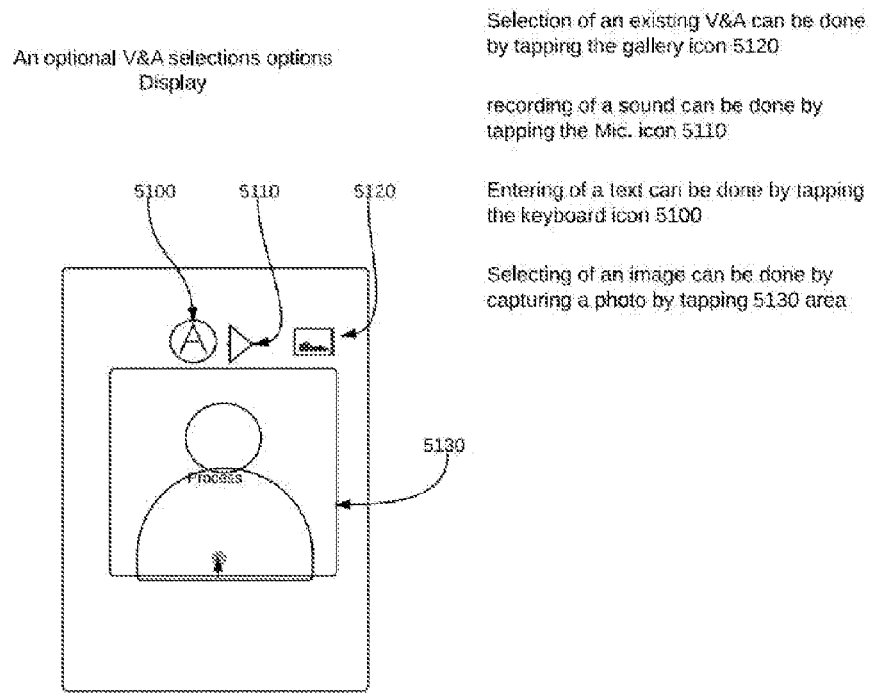
FIG. 5A illustrates optional configurations for presenting and selecting V&A using a visual display and a touch screen, and/or buttons, with one embodiment of the invention.
Figure 5B:
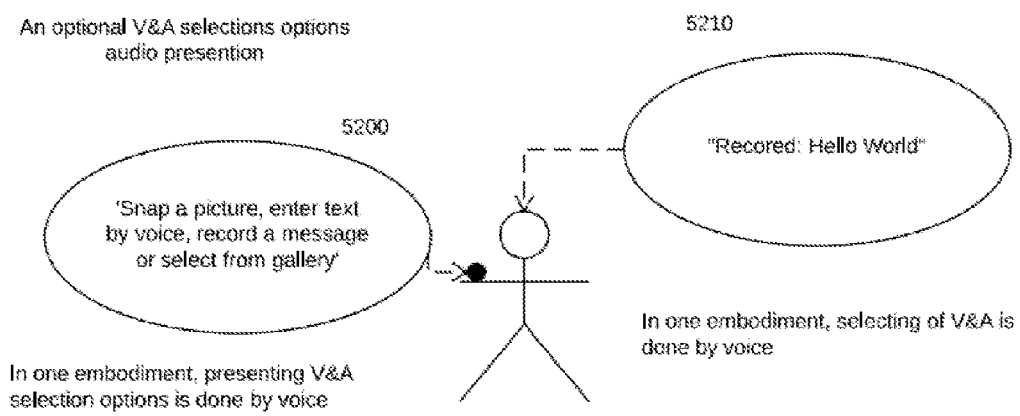
FIG. 5B illustrates optional configurations for presenting and selecting V&A using sound and voice, with one embodiment of the invention.

FIGS. 5A and 5B illustrate optional methods and UI for selection of V&A presented by visual display, and by audio display. Such methods can be used for 2100, 2120 on FIG. 2A. and 2230, 2260 on FIG. 2B. The methods described on FIG. 5A, 5B enable the selection of V&A accessible by the device (stored within it, and/or accessible via browsing), capturing new V&A, such as pictures and video, and/or entering a new V&A, such as text.

5100 illustrates a keyboard icon. Tapping it can open a keyboard for entering text. The entered text can be then used as the selected V&A, or a part of it.

5110 illustrates a microphone icon. Tapping it can start a recording using the microphone of the device. The entered voice, and/or sound can be then used as the selected V&A, or a part of it.

5120 illustrates a gallery, and/or a media folder icon. Tapping it can open the gallery app, and or a media folder, and let the caller choose a V&A existed there. The chosen V&A can be then used as the selected V&A, or a part of it.

5130 illustrates a camera view area, showing the view of a camera of the device, such as a camera facing the user of the device. Tapping 5130 can capture a picture and/or a video. It can be then used as the selected V&A, or a part of it.

5200 illustrates a voice presented by the system, asking the user to select V&A.

5210 illustrates an optional answer by the caller to 5200. In this example, 5210 is a command, asking the system to record the message "Hello world". The output of 5210 can be then used as the selected V&A, or a part of it.

Caller's Device Config-UI#

FIG. 6. Illustrates UI embodiments for presenting V&A and/or recipient selection options to the caller, including options for utilizing device's existing UI, or adding a single button to existing UI, for configuring it to perform its invention function.

FIG. 6 presents optional UI for 2100, 2120 and 2190 on FIG. 2A. And 2210, 2230, 2260, 2270 on FIG. 2B.

6000 represents a standard camera screen UI.

6010 represents a standard contacts screen UI.

6020 represents a standard 'Browse photo gallery' UI.

FIG. 6A and FIG. 6B illustrates optional UIs for the operation of selection of V&A and recipient for sharing, with one embodiment of the invention 6A illustrates presenting the option to share V&A by phone, on a V&A selection, And/or generation screen, like the camera screen 6000. The system presents 6030 on this screen, and then, if clicked takes the caller to 6010 to complete the selection needed on some embodiments, by selecting a recipient.

6B illustrates presenting the option to share V&A by phone, on a recipient selection screen, like the screen 6010. The system presents 6030 on this screen, and then, if clicked takes the caller to 6000 to complete the selection needed on some embodiments, by selecting a V&A.

6030 Is a button that can be added to default screens, and/or other V&A and recipient selecting screens, such as 6010, and 6000. This button can in some embodiments also presented by using a pop-up, a voice, or other types of D&S.

FIG. 7 illustrates optional UI for a single screen, and a single operation selection of V&A and recipient for sharing.

7000 is a camera view area with an option to capture a photo, or a video, to be selected as a V&A.

7010 is a contacts presenting area, where potential recipients for the call are presented. Contacts can be presented by frequency, or any other sorting technique.

In one embodiment of this screen's UI tapping a contact, can mean a selection of both a recipient and a V&A. For example by capture a photo and share it by making an outgoing call to that contact. This can lead to 2150 on FIG. 2A.

Figure 7B:
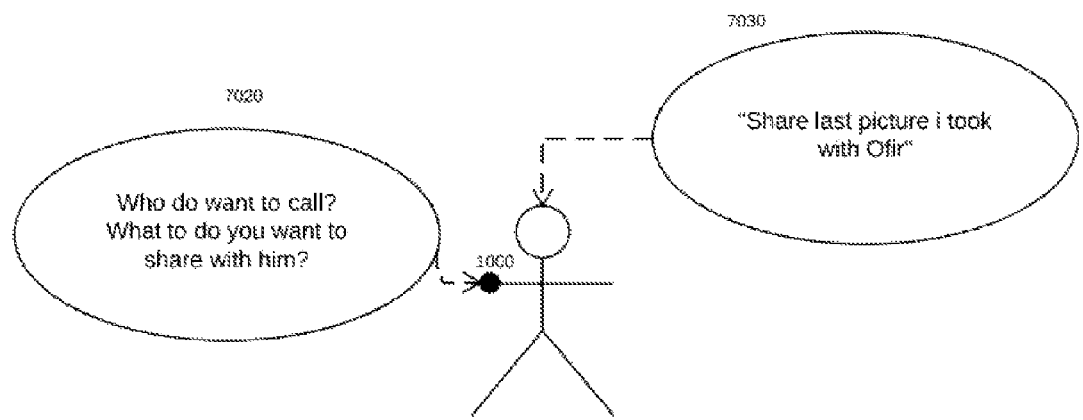
FIG. 7B. Illustrates another optional UI, using sound and voice, for a single caller screen implementation of the invention, and for a single caller operation implementation of the invention, with another embodiment of the invention.

FIG. 7B Is a single selection audio UI example, that can be used for 2100, 220 and 2190 on FIG. 2A. and 2210, 2230, 2260, 2270 on FIG. 2B.

7020 illustrates a voice presented by the system, asking the user to select V&A and a recipient.

7030 illustrates an optional answer by the caller to 7020. It can be a command instructing the system which V&A, and/or recipient to select.

FIG. 7A illustrates an extra optional UI for a single operation selection, involving a V&A selected by the system, that can be used for 2100 on FIG. 2A.

7100-7130 are contacts icons. Clicking one of them can select this recipient, as well as activating the camera to snap a picture of the caller, and select is as a V&A.

Recipient's Device Configuration-UI#

Figure 8:
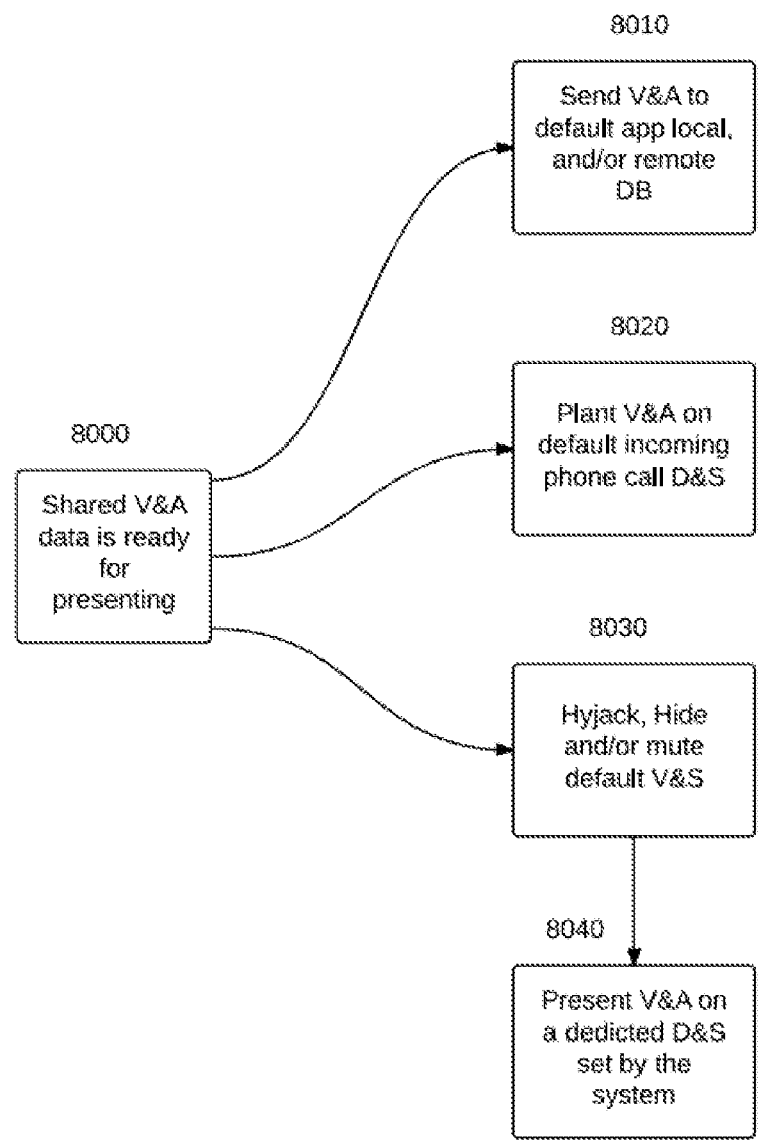
FIG. 8 illustrates optional configuration for presenting D&S on a recipient's device, with some embodiments of the invention

FIG. 8 illustrates optional configuration for presenting D&S on a recipient's device, with some embodiments of the invention. The options relate to 3130 on FIG. 2A.

8000 is equivalent to 3030, 3130, etc.

8010, 8020, 8030 are 3 options for the implementing of 8000. 8040 is part of option 8030.

Figure 9:
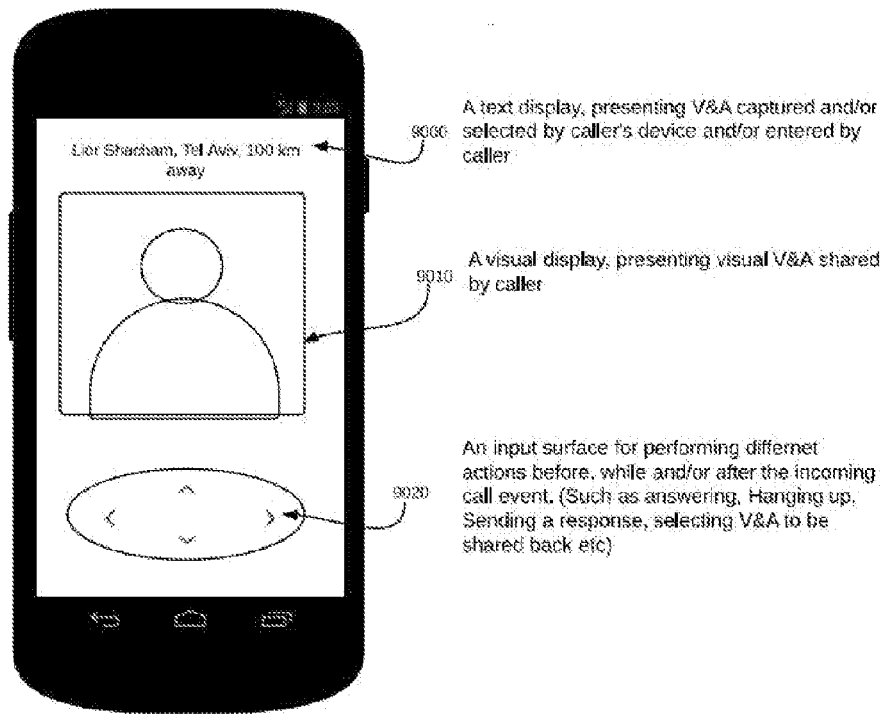
FIG. 9 illustrates incoming phone call event display configuration options, and functionality, with some embodiments of the invention.

FIG. 9 illustrates incoming phone call event display configuration options, and functionality, with some embodiments of the invention.

9000 is a text display explained in the figure.

9010 is a visual display explained in the figure.

9020 is an input surface explained in the figure.

Figure 9A:
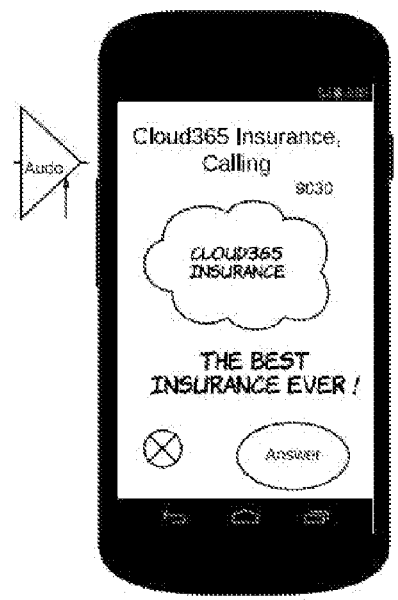
FIG. 9A illustrates incoming phone call event display of an advertisement, with an embodiment of the invention.

FIG. 9A illustrates incoming phone call event display of an advertisement, with an embodiment of the invention.

9030 is an advertisement appearing on incoming call screen.

9040 is a ringtone played on an incoming call event.

Terms and Expressions

General—The terms defined here relates to all pages of this application, including this document, all diagrams, and any other written description included in this application.

Common Expressions:

A and/or B—At least one of A and B. (Any time this expression is stated in this document, it means the same. For example, by Visual and/or sound, we mean: A least one of visual or sound)

A, B and/or C—At least one of A, B and C. (Any time this expression is stated in this document, it means the same. For example, by Capture, enter or choose, we mean: A least one of Capture, enter, and choose.)

Key Terms

D&S—Short for 'Display & Sound'. The Visual Display and/or sound played on a phone device on a specific event (like an incoming call, incoming message, wake up alert, etc). The term D&S on this document refers always to at least one of the two components: Display, Sound and a combined visual display and sound played, like a video.

V&A—Short for Visual & Audio. Visual data and/or Audio data (like picture, text, voice recording, ringtone file, video, etc). V&A may include any kind of Visual and/or audio data and/or file. The term V&A on this document refers always to at least one of the components: visual data, audio data, and a combined visual data and audio data, like a video.

Selected V&A—A V&A selected by the caller, or the system, to be shared using a phone call. The selection of the V&A can be done by selecting between accessible V&A, capturing, and/or recording new V&A and/or entering a new V&A, such as a text, a voice, etc. A Selected V&A is a V&A that was selected prior to sending it.

Phone/Phone Device—Any electronic device, platform, and/or an app which is configured to make phone calls (for example a mobile phone, a PC computer, a wearable computing device like google glass, a web or a mobile app like gmail, etc)

Other Terms

Phone call event—The time frame, and/or actions, associated with the phone call, from initiating it, until it's terminated.

Present V&A Data—Display a visual data, and/or play an audio data. Including playing a combined visual and audio data, like a video.

Incoming call D&S—The visual image/s shown and the audio played while an incoming call is waiting to be answered on a phone device.

Real-Time D&S—A display and sound shown on a device at a short (e.g. less than 1 min) time frame, since it was captured or entered on another device.

Caller—The calling party in a phone call. Someone who initiates a phone call. The caller may be one of the following: a human, a machine, an automatic process, etc.

Recipient/Called Party—Someone who receives a phone call. The called party of a phone call. The user of the phone device who presents the sent V&A.

Setting a D&S of a device—Determining the D&S that will be presented on that certain device.

device's sensors—Elements on the device that can capture, and/or record V&A data or other input (like a camera, microphone, GPS, keyboard, touchscreen etc).

The invention claimed is:

1. A system for sharing selected V&A data by a phone call with a specific recipient, the system comprising:
   a. At least 1 phone device, configured as a caller device to
      (1) get a Caller ID,
      (2) link said V&A data to said Caller ID,
      (3) send said V&A data and Caller ID, and
      (4) initiate a phone call;
   b. At least 1 phone device, configured as a recipient device to
      (1) receive said V&A data and Caller ID,
      (2) get said phone call's Caller ID,
      (3) match Caller ID of said phone call with the Caller ID linked to said V&A data, and
      (4) present said V&A data;
   c. wherein, the caller device shares the selected V&A data with the recipient device in a mostly concurrent manner with the initiation the phone call event, while the recipient device receives said data and presents said data in any time near the receiving of the said phone call event.

2. The system of claim 1, wherein the shared V&A, is any kind of visual, audio data or other files, that have existed at the caller's device prior to the phone call event.

3. The system of claim 1, wherein the V&A data, is real-time data that was captured using the phone device's sensors, prior, or on the event of the phone call (e.g., a photo of the caller, GPS location coordinates).

4. The system of claim 1, wherein the shared V&A, is an advertisement.

5. A method for Sharing V&A data with a caller device by a system of claim 1, comprising:
   a. get a Caller ID of the caller device;
   b. get a selected V&A;
   c. get a selected recipient for a phone call;
   d. link said Caller ID to the selected V&A;
   e. send said Caller ID and selected V&A to the recipient's device;
   f. initiate a phone call event to recipient's device.

6. A method for receiving and presenting V&A data with a recipient device by a system of claim 1, comprising:
   a. Get incoming call Caller ID;
   b. Get V&A and Caller ID that were received from said caller device;

c. Check if the Caller ID that was received from said caller device matches the caller ID of the caller of the incoming call;
d. If true, Present the V&A on phone call event D&S.

7. The system of claim 1, wherein the said phone devices communicate directly using a standard communication protocol.

8. The system of claim 1, wherein further comprising a server configured to transfer data between said phone devices.

9. The system of claim 8, wherein said server is configured to send notifications to recipient's device, when a V&A data reaches it.

10. The method of claim 5, wherein data for the purpose of system actions 'b' and 'c' is gathered by performing 2 actions by the caller: (action c) selecting a recipient, and (action b) selecting V&A data to share; wherein V&A data selection is fulfilled by selecting at least one of the following: existing V&A data on caller phone device, capturing new V&A data using sensors on said caller phone device.

11. The method of claim 5, wherein the data for system actions 'b' and 'c' is gathered by performing a single action by the caller, that is comprised of the following system and caller actions:
   a. pre-defining V&A data by caller before attempting to execute the phone call event;
   b. (action c) caller selects a recipient for executing a phone call event;
   c. (action b) System selects the pre-defined V&A.

12. The method of claim 11, wherein, the step of pre-defining V&A data is fulfilled by at least one of the following:
   a. defining default V&A data using a V&A selection application that selects data from at least one of the following: (a) stored V&A data on caller device, (b) V&A data gathered by any of the device sensors;
   b. selecting V&A data that is currently displayed by another running application;
   c. highlighting V&A data displayed on the caller device screen.

13. The method of claim 6, wherein system action 'd' is comprised of the following system actions:
   a. executing on the recipient's device one of the following: hiding, hijacking, and muting a default incoming call display or sound;
   b. presenting the received V&A data.

14. The method of claim 6, wherein system action is comprised of the following system actions:
   a. presenting said received V&A data;
   b. deleting said received V&A data.

15. The method of claim 5 wherein, after sending the selected V&A to the recipient's device, the system delays the initiation of the phone call event in order to provide enough time for the V&A data to be sent.

16. The method of claim 5 wherein, the selected V&A data may be labeled as real time V&A for preventing the presentation of said V&A data if the recipient device received said V&A data after a certain pre-defined time period.

17. The method of claim 10 wherein, the V&A selecting is fulfilled using a visual UI that is comprised of a camera view area and various buttons enabling the user to select or otherwise capture the V&A presented in the camera view area.

18. The method of claim 10 wherein, the V&A selecting is fulfilled using a vocal UI; The system issues vocal directions to the caller for selecting the V&A, and the caller selects or otherwise captures the V&A with the use of vocal commands.

19. The method of claim 10 wherein, the V&A selecting is fulfilled using the default visual UI of the phone device while adding UI buttons that perform said 2 actions, atop the default UI.

20. The method of claim 10 wherein, the V&A selecting and recipient selecting is fulfilled using a visual UI that is comprised of a camera view area and potential recipients buttons that are sorted by frequency, or any other known sorting technique; wherein, the V&A that is displayed on the camera view, is captured by the system when the caller chooses one of the potential contacts.

* * * * *